Aug. 8, 1939.    L. N. MESTRE    2,168,487
EPISCOPIC APPARATUS
Filed April 1, 1937    4 Sheets-Sheet 1

Inventor
Louis N. Mestre
by Wilkinson & Mawhinney
Attorneys.

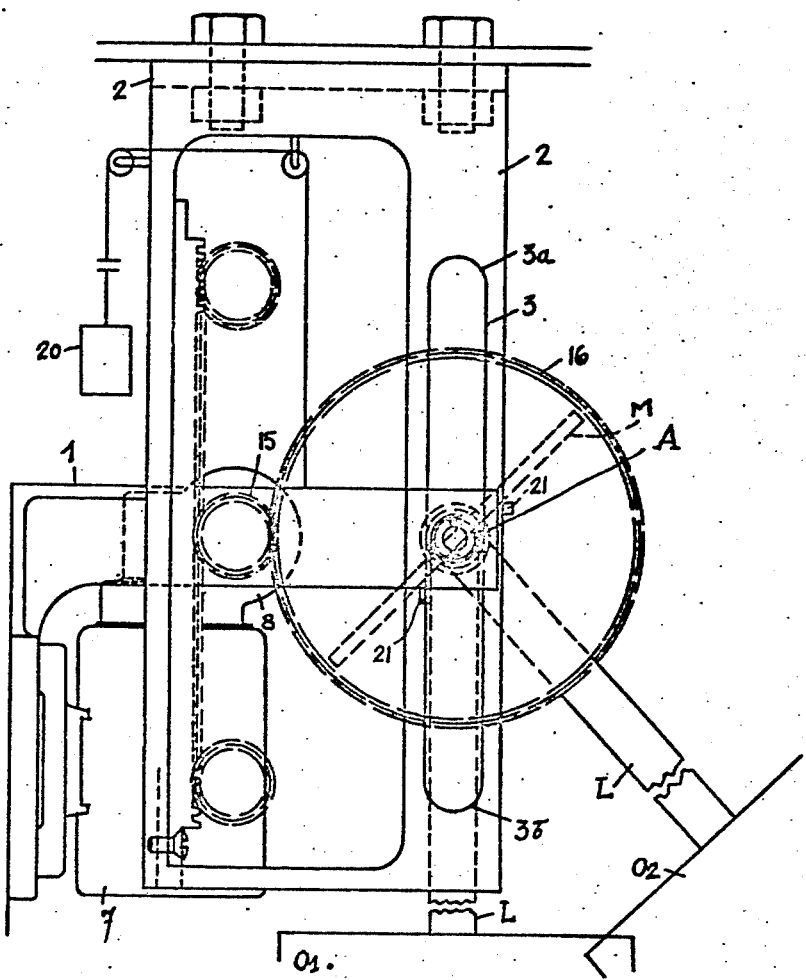

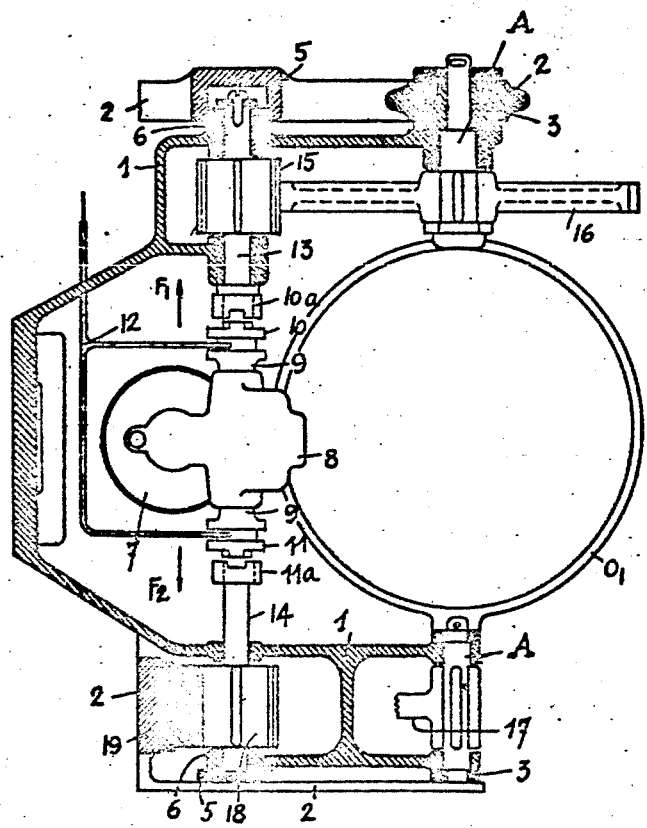

Patented Aug. 8, 1939

2,168,487

UNITED STATES PATENT OFFICE 2,168,487

EPISCOPIC APPARATUS

Louis Nicolas Mestre, Paris, France, assignor to Anciens Etablissements Barbier, Benard & Turenne, Paris, France, a joint-stock company Application April 1, 1937, Serial No. 134,390
In France April 2, 1936

2 Claims. (Cl. 88—24)

The present invention relates to improvements in episcopic apparatus.

In apparatus of this kind, when it is desired during projection to pass from a reduced field to a large field, it is necessary to change the whole projecting device in particular the mirrors and the screens, owing to the modifications in the incident and emergent beams.

The present invention permits on the contrary of passing immediately from a reduced field to a large field, or conversely, by a simple operation of the projecting device.

The episcopic apparatus according to the invention is essentially characterized by the fact that it comprises a small field objective and a large field objective, each of said objectives, which have different focal distances, being adapted to be brought either into the operative position, that is to say in the path of the luminous beam, while the other is in an inoperative position, or into the inoperative position while the other is in the operative position.

According to an advantageous characteristic of the invention, the operative position of the small field objective is between the observed field to be projected and the usual image erecting mirror, whereas the operative position of the large field objective is between the mirror and the projection screen.

According to a particularly advantageous embodiment, the two objectives are carried by an oscillating lever which a segment provided with stop notches can lock, under the action of a spring for example, in two distinct positions for one of which it is one of the objectives which is in the operative position, whereas for the other position, it is the other objective which occupies said operative position.

The invention also relates to a control mechanism which enables, not only the two objectives to be placed in the operative or/and the inoperative position, but also the maintenance of the conditions of focus of the image.

According to the invention, the axis about which the rotation of the support of the objectives is controlled for placing them in the operative or inoperative position is carried by a carriage of which the distance relatively to the field to be observed can be adjusted for focussing.

The same control means, comprising for example a motor, serve on the one hand to control the rotation of the support of the objectives and on the other hand to control the displacement of the carriage.

Between the controlling motor and each of the two members to be controlled (support of the objectives; carriage) is interposed a clutch device which is brought into the driving position when it is desired to control the corresponding member.

The motor and the clutch devices can advantageously be controlled from a distance.

According to a particularly advantageous embodiment, the carriage supports not only the supporting spindle of the objectives but also the motor, the clutch devices and the members for transmitting the movements, so that it is this whole assembly which moves when focussing.

Said carriage is guided in its movements by suitable fixed slides, its movement being imparted to it for example by a gear driven by the motor and meshing with a fixed rack.

Other characteristics and peculiarities of the invention will become apparent from the ensuing description taken in conjunction with the accompanying drawings in which:

Fig. 3 is an elevational view of a control mechanism according to the invention.

Fig. 4 is the corresponding plan view.

Fig. 5 is a diagrammatic view of the whole arrangement.

Figure 1:
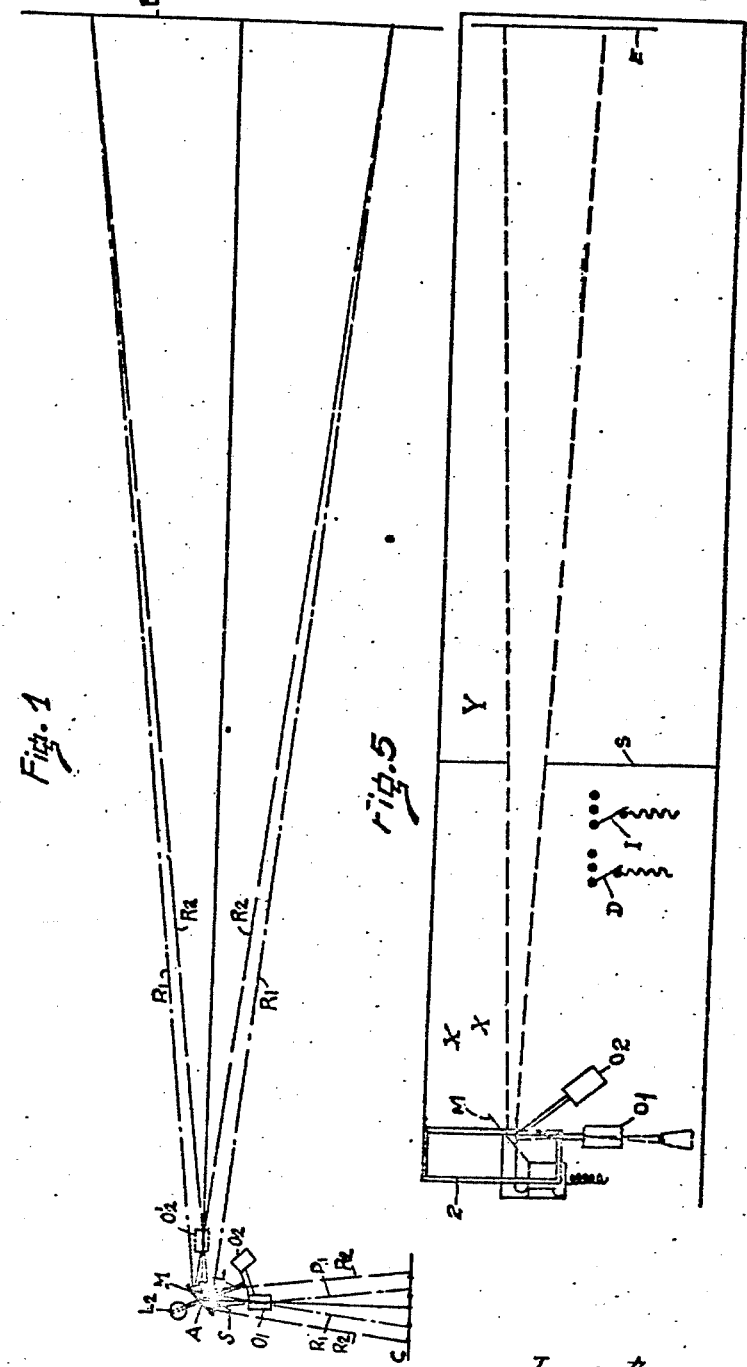
Fig. 1 is a diagrammatic view showing the principle of the invention.

The episcopic apparatus according to the invention, shown in the drawings, is intended to permit of the projection on a screen E of an image of the observed field C which can, for example, be a surgical operating table.

The apparatus comprises a first objective $O1$ which will permit of the projection of a reduced field, and a second objective $O2$ which will permit of the projection of a more extended field. According to the embodiment shown in the drawings, these two objectives $O1$ and $O2$ are carried by a lever L which can pivot about a fixed fulcrum A. A segment S can pivot about a pin 83 and has two stop notches 81 and 82. It is subjected to the action of a spring 84. The pivoting lever L has a finger L1 which engages in one or the other of the stop notches 81 and 82, whereby the assembly formed by said lever L and the two objectives $O1$ and $O2$ can be locked either in the position shown in Fig. 2 in which it is the small field objective $O1$ which is in the operative position, between the observed field S and the usual image erecting mirror M, or in a second position in which the finger L1 is engaged in the notch 82, and in which position it is the large field objective O2 which is in the operative position between the mirror M and screen E.

Figure 2:
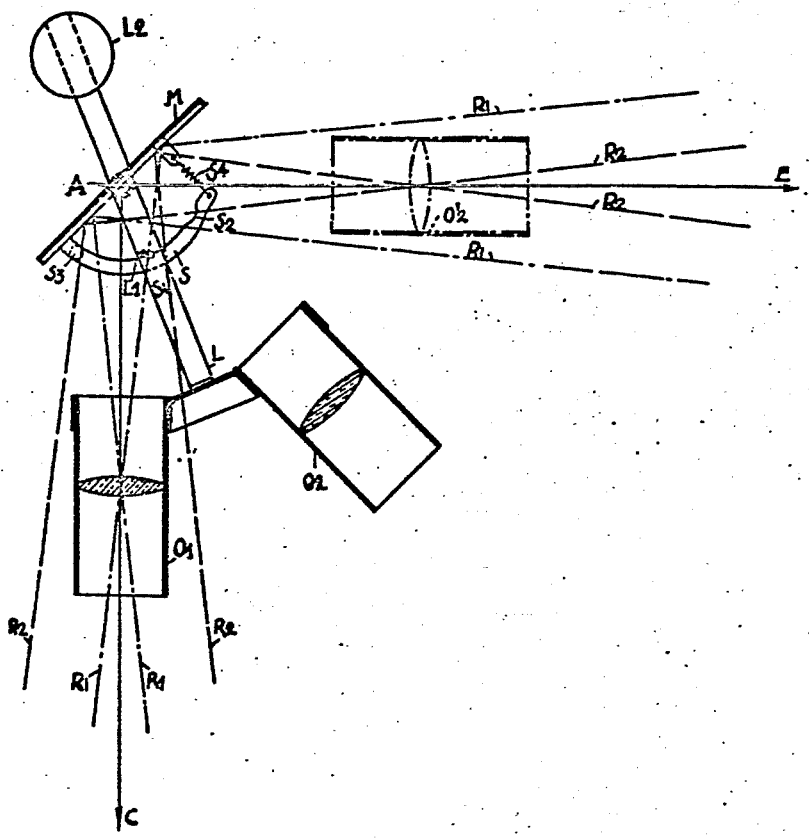
Fig. 2 shows, on a larger scale, an embodiment of the optical device.

Said episcopic apparatus operates under the following conditions:

When it is desired to project on the screen E only a reduced field, the lever L, which can be balanced by a counter weight L2, is brought into the position shown in Fig. 2, the objective O1 being in the operative position, whereas the objective O2 is in the inoperative position. The light rays then follow the path indicated by the chain dotted lines R1 and it will be noted that it is a reduced field which is projected on the screen E with great magnification. When it is desired on the contrary to project a large field it suffices to operate the lever L to bring the finger L1 into the stop notch S2. The objective O2 is then in the position shown in dotted lines at O'2 in Fig. 2, whereas the objective O1 is in the inoperative position which was previously occupied by the objective O2. In this case, the light rays follow a path shown by the long dash lines R2. It will then be observed that in this case, it is a more extended field which is projected on the screen E with a smaller magnification.

In Figs. 3 to 5 the small field objective O1 and the large field objective O2 are again found, mounted on a support L carried by a spindle A.

According to the embodiment of Figs. 3 to 5 said spindle A is carried by a carriage 1 which can slide vertically in a fixed frame 2 secured, for example, to the ceiling of the operating room. For guiding the carriage 1, the frame 2 has grooves 3 in which are engaged the two portions of the spindle A. Said carriage is also guided by slides 5 provided on the frame 1 and in which are engaged bearing surfaces 6 of the carriage 1. For greater clearness, said slides 5 are not shown in Fig. 3.

The carriage 1 carries the mechanism for controlling the retraction of the objectives O1 and O2, and the up and down movement for focussing the image of the observed field.

This control mechanism could be of any appropriate nature, and it is only by way of purely indicative example, that it has been assumed in the embodiment shown, that it includes an electric motor 7, it being possible to replace said motor by any equivalent means of control.

Said motor comprises a speed reducer 8 of which the shaft 9 carries two clutch plates 10, 11. These latter are shown in Fig. 2 in the inoperative position; when they are moved in the direction of the arrow F1 by means for example of the fork 12, the plate 10 engages with the plate 10a, carried by a spindle 13; on the contrary, when they are displaced in the direction of the arrow F2, it is the plate 11 which engages with the plate 11a of the spindle 14.

The spindle 13 controls the retracting movement of the objectives. For this purpose on said spindle 13 is keyed a pinion 15 meshing with a wheel 16 keyed on the shaft A. Thus, by rotating the motor 7 in the required direction and by manipulating the fork 12 to engage the plates 10 and 10a, an angular displacement of the shaft A and of the support L is obtained in the corresponding direction and consequently the bringing into the operative position of one or the other of the two objectives. The assembly of the two objectives O1 and O2 and of their support L, can be balanced by means of a counter weight fixed for example at the end of an arm 17 keyed on the shaft A (see Fig. 4).

It is of course indispensable that as a result of its angular movements, the shaft A should always stop in one or the other of the two accurately determined positions which it can occupy. Stops 21 can be provided for this purpose. It will also be preferable for the mechanism which controls the angular displacements of said shaft A, that is to say the electric motor 7, to stop automatically when the shaft A reaches one or the other of the two positions in question. To obtain such automatic stop, a switch automatically opened by the shaft A when it reaches one or the other of said two positions, can for example be provided in the supply circuit of the motor 7. Or again, in the case in which the clutch release fork 12 is also controlled by an electric or electromagnetic device, the switch controlled by the shaft A could be interposed in the electric circuit controlling said fork so that the release of the plates 10 and 10a is automatically controlled when the shaft A reaches one or the other of the two positions in question.

The spindle 14 mentioned above, serves for controlling the vertical movement of the carriage 1. For this purpose, on said spindle 14 is keyed a gear 18 meshing with a vertical rack 19 secured to the support 2. Under these circumstances, when the motor 7 is started up and the plates 11 and 11a are engaged, the gear 18 rolls on the rack 19, and causes the upward or downward movement of the assembly of the carriage 1 and of the members which it supports, in particular of the objectives O1 and O2. The distance of the objective in the operative position with respect to the field to be observed, can thus be adjusted with great accuracy, and consequently, an accurate focussing of the image of said field can be effected to take into account the possible movements in height of the focussed object or to observe different planes of said object. The assembly of the carriage 1 and of the members which it supports can be balanced by a counterweight 20. The movements in height of said carriage 1 are limited in both directions, by the ends 3a and 3b of the groove 3. End of travel switches can be provided to automatically control the stopping of the motor 7 or the releasing of the plates 11, 11a when the carriage 1 reaches the end of its travel.

The control mechanism according to the invention can be advantageously operated at a distance. For example for the installation of an episcope provided with a mechanism of this kind, the arrangement shown diagrammatically in Figure 5 can be adopted, wherein the operating room is shown at X, and the lecture room, where the projection screen E is arranged, at Y. In said lecture room Y there must be complete darkness as in all projection rooms. The operator effecting the projection can be advantageously placed in the operating room X, near the separating partition S, opposite a window permitting him to examine the screen E. He has, within reach of his hand, a three position switch I, to each of which positions there respectively correspond the operation of the motor 7 in one direction, its stoppage, or its operation in the opposite direction. He has, also within reach of his hand, a clutch release lever D, adapted to occupy three positions, to each of which there correspond respectively the engagement of the shaft 9 with the spindle 13, the total release of said shaft 9, and its engagement with the spindle 14. Said clutch release lever D can control the clutch release fork 12, through the instrumentality of any suitable remote control connection (flexible, electric, electro-magnetic etc. control).

When the operator wishes to pass from the large field projection to the small field projection, it will suffice for him to operate the switch I and the lever D to cause the motor 7 to start up in the corresponding direction, and the engagement of the shaft 9 with the plate 10a. On the other hand, when said operator wishes to effect the focussing of the image, he will only have to operate the switch I and the lever D to cause the starting up of the motor 7 in the desired direction, and the engagement of the shaft 9 with the shaft 14.

Of course other modifications for the remote control of the two movements can be adopted. For example, for the up and down movement of the carriage, two switches can be provided preferably of the rocker type with a zero retracting mechanism. Each of said switches, at the beginning of its travel, controls the engagement of the plates 11, 11a. At the end of its travel, one of them starts up the motor in one direction whereas the other starts it up in the opposite direction. Under these circumstances, it suffices for the operator to depress one of these buttons to obtain the raising or lowering of the carriage. As soon as he stops his action, the movement stops and the plates 11, 11a are disengaged.

According to the same modification, two switches could also be provided for the retracting movement of the objectives; said switches will be preferably of the push type with automatic locking in the closed position. One of said switches will serve for the retraction of one of the objectives and for this purpose it will control, at the beginning of its travel, the engagement of the plates 10, 10a and, at the end of its travel the starting of the motor in the desired direction. The other switch will correspond to the retraction of the other objective, it will also control the engagement of the plates 10, 10a, but the operation of the motor in the opposite direction. Of course the depression of one of the switches will cause the release of the other. By means of this arrangement the operator always knows which objective is in the operative position.

In the example shown, it has been assumed that the angle of projection was the normal angle of 90°. When this angle cannot be respected owing to particular arrangements of the lecture rooms, the mirror M will be inclined in a corresponding manner and means will be provided so that the respective operative positions of the two objectives O1 and O2, actually have between them the desired angle of projection. For example, one of the objectives or both can be adjustably mounted on the shaft A, with locking in the selected position. Or again the angle between the two locking positions of the shaft A could be correspondingly varied.

It is moreover obvious that the invention has only been described and illustrated herein in an explanatory and nowise limitative manner and that modifications of detail can be made therein without altering its spirit.

I claim:

1. Episcopic apparatus comprising an inclined mirror throwing back on a screen the luminous beam issuing from the field to be observed, a lever pivoting about a horizontal spindle parallel to the screen and passing through the axis of the mirror, a small field objective and a large field objective carried by said pivoting lever, means for controlling the pivoting of the said lever and means for bringing it to a standstill either in a position for which the small field objective is in the path of the luminous beam, between the field to be observed and the mirror whilst the large field objective is outside of said path, or in a position for which the large field objective is situated in the path of the luminous beam between the mirror and the screen, whilst the small field objective is situated outside said path.

2. Episcopic apparatus comprising an inclined mirror throwing back on a screen the luminous beam issuing from a field to be observed, a vertically displaceable carriage, a spindle supported by this carriage, a lever keyed to said spindle and carrying a small field objective and a large field objective, an electric motor supported by said carriage and controlling a speed reducer, the shaft of which is capable of sliding longitudinally and comprises, at one end a first clutch plate for controlling the angular movement of the lever carrying the objectives and at its other end, a second clutch plate for controlling the vertical movement of the carriage, a first spindle carried by the carriage and provided with a clutch plate disposed in alignment with the first clutch plate of the speed reducer shaft, a pinion keyed to the said first spindle meshing with a pinion keyed to the spindle of the lever carrying the objectives, a second spindle carried by the carriage and provided with a clutch plate arranged in alignment with the second clutch plate of the speed reducer shaft, a pinion keyed to the said second spindle and meshing with a fixed vertical rack, and means for controlling the sliding of the speed reducer shaft for bringing it either in its neutral position or in its position for which its first clutch plate is in engagement with the clutch plate of the said first spindle, or in its position for which its second clutch plate is engaged with the clutch plate of the said second spindle, means for driving the electric motor in one direction or the other and means for stopping the lever carrying the objectives either in a position for which the small field objective is in the path of the luminous beam, between the field to be observed and the mirror whilst the large field objective is outside of said path, or in a position for which the large field objective is situated in the path of the luminous beam between the mirror and the screen, whilst the small field objective is situated outside said path.

LOUIS NICOLAS MESTRE.